F. E. TEN EYCK.
AIR PUMP.
APPLICATION FILED OCT. 30, 1908.
924,855.
Patented June 15, 1909.
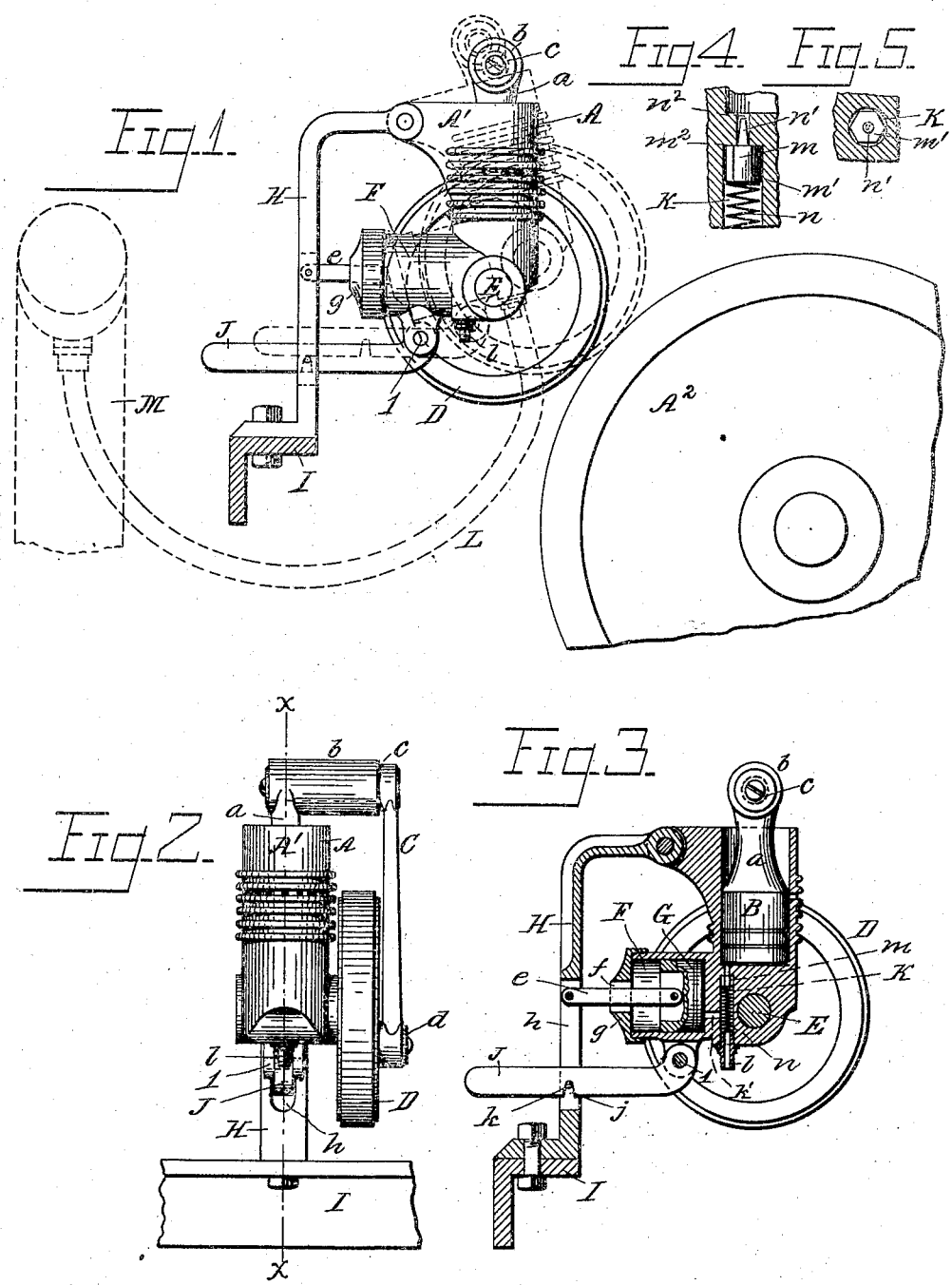

UNITED STATES PATENT OFFICE.

FRANK E. TEN EYCK, OF AUBURN, NEW YORK.

AIR-PUMP.

No. 924,855.　　　　Specification of Letters Patent.　　Patented June 15, 1909.

Application filed October 30, 1908. Serial No. 460,287.

*To all whom it may concern:*

Be it known that I, FRANK E. TEN EYCK, a citizen of the United States, residing at Auburn, in the county of Cayuga and State of New York, have invented certain new and useful Improvements in Air-Pumps, of which the following is a full and exact description.

My invention relates to improvements in air-pumps, and more particularly to that class of air-pumps adapted to automobile uses, for the inflation of tires and other purposes.

The objects of my improvements are, first, to provide an air-pump that while light and compact, is sufficiently powerful to fully meet the demand required of it; second, to provide an air-pump that can be automatically moved into engagement with the actuating power; and, third, to provide means by which the pump can be held in an inoperative position.

Referring to the accompanying drawings in which similar letters indicate similar parts throughout the several views,—Figure 1 is a side elevation of my air-pump as it appears secured to a part of the frame of an automobile and also showing in dotted lines the position of the pump when in engagement with the operative means. Fig. 2 is a front elevation of the pump. Fig. 3 is a part section on the line X—X of Fig. 2, and Figs. 4 and 5 are details of the valve.

A is the compressing chamber of the air-pump A' in which is the piston B, the piston-rod $a$ is preferably integral with the piston, its upper end $b$ constructed to form a bearing for the upper end $c$ of the crank arm C, the lower end of the crank arm C is pivoted to a friction wheel D by a crank-pin $d$; the friction wheel D is mounted on a shaft E which revolves in a suitable bearing beneath the compressing chamber A. A chamber F, preferably at an angle to the chamber A and beneath it, has a piston G; a piston-rod $e$ is pivotally secured to the piston G and projects through a slot $f$ in a cap $g$ on the outer end of the chamber F, and is pivotally attached to an arm H bolted to a bar I, shown in cross-section and representing a side bar of an automobile frame; the upper end of the arm H forms a support for the pump A' which is pivotally mounted thereon.

A passage K leads from the chamber A and is provided at its lower end with a nipple to which a pipe or flexible tubing may be attached; at the upper end of the passage K is seated a valve $m$, normally held closed by a spring $n$; this valve is of a type commonly in use, and consists of a hexagonal body $m'$ held to its seat $m^2$ by a spring $n$ in the passage K; a conical pin $n'$, attached to the hexagonal body $m'$, projects into an opening $n^2$ from the compressing chamber A to the passage K; between the passage K and the chamber F is an opening $k'$.

In order to prevent a swinging movement of the pump A' when not in operation, I employ a bar J which moves in a slot $h$ in the arm H, and is attached to the pump A' at 1; a notch $j$ in the bar J engages with a pin $k$ in the slot $h$ in the arm H.

The pump A' is usually mounted upon the frame or other part of an automobile, when used for automobile purposes, in close proximity to a revolving portion of the automobile mechanism, in this instance the balance wheel of the machine, A² representing such a wheel in part. When a tire needs inflating, a pipe or tube L is connected to the nipple $l$, and also to the nipple of the valve in the tire M as shown in dotted line in Fig. 1; the instant the latter connection is made, the air that is in the tire M enters the passage K through the tube L, and as the valve $m$ closes the passage K against the admission of air into the chamber A, its pressure is exerted upon the piston G through the opening $k'$, and, as the piston G does not move, and the pump being pivoted upon the support or arm H, the air acting equally upon the piston G and the end of the chamber F, forces the pump automatically outward until the friction wheel D engages with the balance wheel A², upon the bar J being released from engagement with the pin $k$, as shown in dotted lines in Fig. 1; upon starting the engine, the revolution of the balance wheel A² by its contact with the friction wheel D, operates the pump A'; air is admitted to the chamber A, on the upstroke of the piston B, through suitable openings $a^2$; the down stroke of the piston B compressing the air until its force is sufficiently great to open the valve $m$, and admit the compressed air into the passage K and through the tube L into the tire M.

Should a tire be flat and not contain any air under pressure, it is evident that the pump A' would remain in its normal position and out of operation, even if the bar J was released from engagement with the pin $k$, in that event the engine is first started, the bar J is disengaged from the pin $k$, and, using the bar J as a lever, the pump is swung until the friction wheel D is in contact with the revolving balance wheel A², two or three revolutions of the friction wheel D being sufficient to generate enough back pressure in the chamber F, between the piston G and the end of the chamber, to hold the pump forward, and the two wheels, D and A², in contact to operate the pump A' until the desired quantity of air has been forced into the tire or other receiver. It is clear that the pressure on the piston G increases with the pressure in the tire or receiver, and the two wheels D and A² are consequently held more firmly in contact.

Upon removing the tube or pipe L from the nipple l on the pump A', or from the nipple on the tire M, the air exhausts from the chamber F through the opening k' and the passage K, the pump swings to its normal position, or is moved there by the bar J and is held by the notch j in the bar J catching on the pin k on the support H, securing the pump against any further movement until it is again desired to operate it.

While I have shown my device as applied to an automobile for inflating tires, I do not limit myself to its use for this purpose, as it is clearly evident it may be used for filling tanks, or other receptacles, with compressed air, the pump being so located as to bring the friction wheel automatically, or by movement of the lever J, into contact with any movable body that will cause the friction wheel D to revolve.

Having thus described my invention, what I claim as new and desire to secure by Letters Patent, is—

1. The combination with an air pump, of means for actuating the same including a friction wheel adapted to be actuated by some moving device, and means for holding said friction wheel in contact with its actuating device with increased pressure as the pressure of the air compressed by the pump increases.

2. The combination with the cylinder and piston of an air pump, of means for operating the same including a friction wheel adapted to be actuated by contact with a moving device, and means for holding said friction wheel in contact with its actuating device with increased force as the resistance to the piston increases.

3. The combination with an air pump, of means for actuating the same including a friction wheel, said friction wheel being movable toward and from an actuating device therefor, and means for holding said friction wheel in contact with its actuating device and increasing the force of the contact of said friction wheel as the resistance to the piston of the pump increases.

4. The combination with an air pump, means to actuate said pump including a friction wheel connected with said pump, said pump and friction wheel being movable toward and from the part from which the friction wheel derives motion, and means for moving the pump and friction wheel into position to bring the friction wheel into operation and to increase the pressure of the friction wheel upon its operating part as the resistance to the piston of the pump increases.

5. The combination with an air pump, of means for operating the same including a friction wheel adapted to be actuated by contact with a moving device, said pump and friction wheel being movable toward and from the actuating device, said pump being provided with an outlet passage from the compression chamber of the pump, a chamber connected with said outlet passage, and a piston in said chamber connected with a stationary part, whereby said pump and friction wheel are forced toward the said actuating device by the back pressure in the said outlet passage.

6. The combination with an air pump pivoted to swing toward an actuating device, a friction wheel connected to said pump, an outlet from the compression chamber of said pump, a chamber, a piston in said chamber having an exterior connection whereby an outward movement of the piston will swing the pump and friction wheel toward the actuating device, and a connection from the said outlet passage with the said chamber to enable the back pressure in the outlet passage to force the said piston outward.

7. An air pump pivotally secured to a support, a catch on the support, and a bar attached to the pump and adapted to engage with the catch to hold the pump out of operation.

8. The combination with an air pump, of means for actuating the same including a friction wheel, said friction wheel being movable toward and from an actuating device therefor, a bar for moving said friction wheel into engagement with the operative means, and means for holding said friction wheel in contact with its actuating device with increased force as the resistance to the piston increases.

In witness whereof I have hereunto set my hand this 22nd day of October, 1908.

FRANK E. TEN EYCK.

Witnesses:
EMMA L. MARQUETTE,
JOSEPH W. BRYAN.